(12) United States Patent
Irish et al.

(10) Patent No.: US 11,961,977 B2
(45) Date of Patent: Apr. 16, 2024

(54) BATTERY MANAGEMENT SYSTEM

(71) Applicant: Hyperdrive Innovation Limited, Sunderland Tyne And Wear (GB)

(72) Inventors: Stephen Irish, Sunderland Tyne And Wear (GB); Robin Shaw, Sunderland Tyne And Wear (GB)

(73) Assignee: Turntide Drives Limited, Gateshead (GB)

( * ) Notice: Subject to any disclaimer, the term of this patent is extended or adjusted under 35 U.S.C. 154(b) by 547 days.

(21) Appl. No.: 17/358,476

(22) Filed: Jun. 25, 2021

(65) Prior Publication Data
US 2021/0320509 A1 Oct. 14, 2021

Related U.S. Application Data

(63) Continuation of application No. 15/554,967, filed as application No. PCT/GB2016/054091 on Dec. 30, 2016, now abandoned.

(30) Foreign Application Priority Data

Dec. 30, 2015 (GB) ...................................... 1523108
Jun. 22, 2016 (GB) ...................................... 1610937

(51) Int. Cl.
*H01M 10/42* (2006.01)
*H01M 10/48* (2006.01)
(Continued)

(52) U.S. Cl.
CPC ......... *H01M 10/425* (2013.01); *H01M 10/48* (2013.01); *H01M 50/51* (2021.01);
(Continued)

(58) Field of Classification Search
USPC ......................................................... 320/134
See application file for complete search history.

(56) References Cited

U.S. PATENT DOCUMENTS 5,870,685 A * 2/1999 Flynn ................ H02J 7/007182
340/7.37
6,586,911 B1 * 7/2003 Smith ................... H01M 10/46
320/136
(Continued)

FOREIGN PATENT DOCUMENTS

CN 102214846 A 10/2011
CN 202712892 U 1/2013
(Continued)

OTHER PUBLICATIONS

Japanesse Notice of Reasons for Refusal for corresponding Application No. 2018-553325, dated Feb. 16, 2021.
(Continued)

*Primary Examiner* — Mohammed Alam
(74) *Attorney, Agent, or Firm* — Temmerman Law; Mathew J. Temmerman

(57) ABSTRACT

A battery management system for use in charging a rechargeable battery is disclosed. The battery management system comprises a controller powered by a first power supply, at least one sensor for providing a sensor signal relating to at least one parameter of the rechargeable battery to the controller, and a data store. The controller is configured to write data to the data store based on the sensor signal. The data store is coupled to a data reader. The data reader is operable to be powered by an auxiliary power supply to read data held by the data store.

2 Claims, 15 Drawing Sheets

(51) Int. Cl.
*H01M 50/271* (2021.01)
*H01M 50/293* (2021.01)
*H01M 50/51* (2021.01)
*H02J 7/00* (2006.01)

(52) U.S. Cl.
CPC ...... *H02J 7/00036* (2020.01); *H02J 7/00047* (2020.01); *H02J 7/0014* (2013.01); *H02J 7/007* (2013.01); *H01M 2010/4271* (2013.01); *H01M 2010/4278* (2013.01); *H01M 50/271* (2021.01); *H01M 50/293* (2021.01); *H02J 7/00045* (2020.01); *H02J 7/0047* (2013.01); *H02J 2207/10* (2020.01)

(56) References Cited

U.S. PATENT DOCUMENTS

| | | |
|---|---|---|
| 8,538,614 B1 | 9/2013 | Nam et al. |
| 2004/0220860 A1 | 11/2004 | Persky |
| 2006/0190745 A1 | 8/2006 | Matsushima |
| 2008/0088462 A1 | 4/2008 | Breed |
| 2009/0146610 A1* | 6/2009 | Trigiani ............... H02J 7/00302 320/119 |
| 2009/0319209 A1* | 12/2009 | Lim ................... G01R 31/3842 702/63 |
| 2010/0201314 A1* | 8/2010 | Toncich ................. H02J 50/20 320/108 |
| 2010/0332233 A1* | 12/2010 | Chen ....................... H02J 9/002 704/200 |
| 2013/0031318 A1* | 1/2013 | Chen ....................... G07C 5/00 711/E12.001 |
| 2015/0089248 A1 | 3/2015 | Obie |
| 2016/0087314 A1* | 3/2016 | Arashima ............... B62M 6/90 320/134 |

FOREIGN PATENT DOCUMENTS

| | | | |
|---|---|---|---|
| CN | 104898476 A | 9/2015 | |
| EP | 0743534 A2 | 11/1996 | |
| EP | 0845682 A1 | 6/1998 | |
| EP | 1225504 A1 | 7/2002 | |
| EP | 1524829 A1 * | 4/2005 | ........... G06F 1/3212 |
| EP | 1786057 A2 | 5/2007 | |
| EP | 2720309 A2 | 4/2014 | |
| JP | 2001352694 A | 12/2001 | |
| JP | 2005312011 A | 11/2005 | |
| JP | 2006228490 A | 8/2006 | |
| JP | 2012080598 A | 4/2012 | |
| KR | 101510960 B1 | 4/2015 | |
| WO | WO-9810610 A1 * | 3/1998 | ........... H02J 7/0011 |
| WO | 03047064 A2 | 6/2003 | |
| WO | 2012120620 A1 | 9/2012 | |
| WO | 2013014878 A1 | 1/2013 | |
| WO | 2014167889 A1 | 10/2014 | |
| WO | WO-2014167889 A1 * | 10/2014 | ........... B60L 3/0046 |

OTHER PUBLICATIONS

European Search Report to counterpart case EP 21205727.7, dated Feb. 1, 2022.
European Search Report to counterpart case EP 21205726.9, dated Feb. 3, 2022.
Japanese Notice of Reasons for Refusal for corresponding Application 2018/553325, dated Dec. 24, 2022.
International Search Report for PCT/GB2016/054091 completed Apr. 27, 2017.
Search Report for GB1523110.3 completed May 5, 2016.
Search Report for GB1523117.8 completed Dec. 19, 2016.
Written Opinion for PCT/GB2016/054091 dated Jul. 10, 2017.

* cited by examiner

BATTERY MANAGEMENT SYSTEM

RELATED APPLICATIONS

The present application is a continuation of U.S. patent application Ser. No. 15/554,967, entitled "BATTERY MANAGEMENT SYSTEM," filed Aug. 31, 2017, which is a U.S. National Phase Entry of International Patent Application No. PCT/GB2016/054091, entitled "BATTERY MANAGEMENT SYSTEM," filed Dec. 30, 2016, which claims the benefit of United Kingdom Patent Application No. 1610937.3, filed Jun. 22, 2016, and United Kingdom Patent Application No. 1523108.7, filed Dec. 30, 2015. Each application is incorporated herein by reference for all purposes.

FIELD OF THE INVENTION

The present disclosure relates to battery management systems, for example battery management systems for rechargeable batteries, and enclosures for batteries using battery management systems.

BACKGROUND

Rechargeable batteries are commonly used in many technologies, for example in electric or hybrid vehicles for use both on-highway and off-highway. For example, rechargeable batteries are frequently used in automotive applications (both on highway and off highway), offshore applications (off highway), in a warehouse environment (for example for use with mechanical handling equipment such as fork-lift trucks and autonomous guided vehicles, for example as described in WO 98/49075—off highway) as well as in energy storage applications (both commercial and domestic—also off highway).

In order to monitor and control the performance of rechargeable batteries in such applications, a battery management system (BMS) may be used.

SUMMARY OF THE INVENTION

Aspects of the invention are as set out in the independent claims. Embodiments are further defined in the dependent claims. Aspects of the invention may be provided in conjunction with each other and features of one aspect may be applied to other aspects.

DRAWINGS

Embodiments of the disclosure will now be described, by way of example only, with reference to the accompanying drawings, in which.

SPECIFIC DESCRIPTION

Embodiments of the present disclosure relate to a battery management system (BMS). In such embodiments, the BMS has a controller that is powered by a primary power supply, such as the battery. The controller records data to a data store. The BMS also has a data reader to read data held by the data store. The data reader is operable to be powered by an auxiliary power supply that bypasses the primary power supply. Data may therefore be read from the data store even if the battery is flat or is no longer functioning, for example due to damage.

Figure 1:
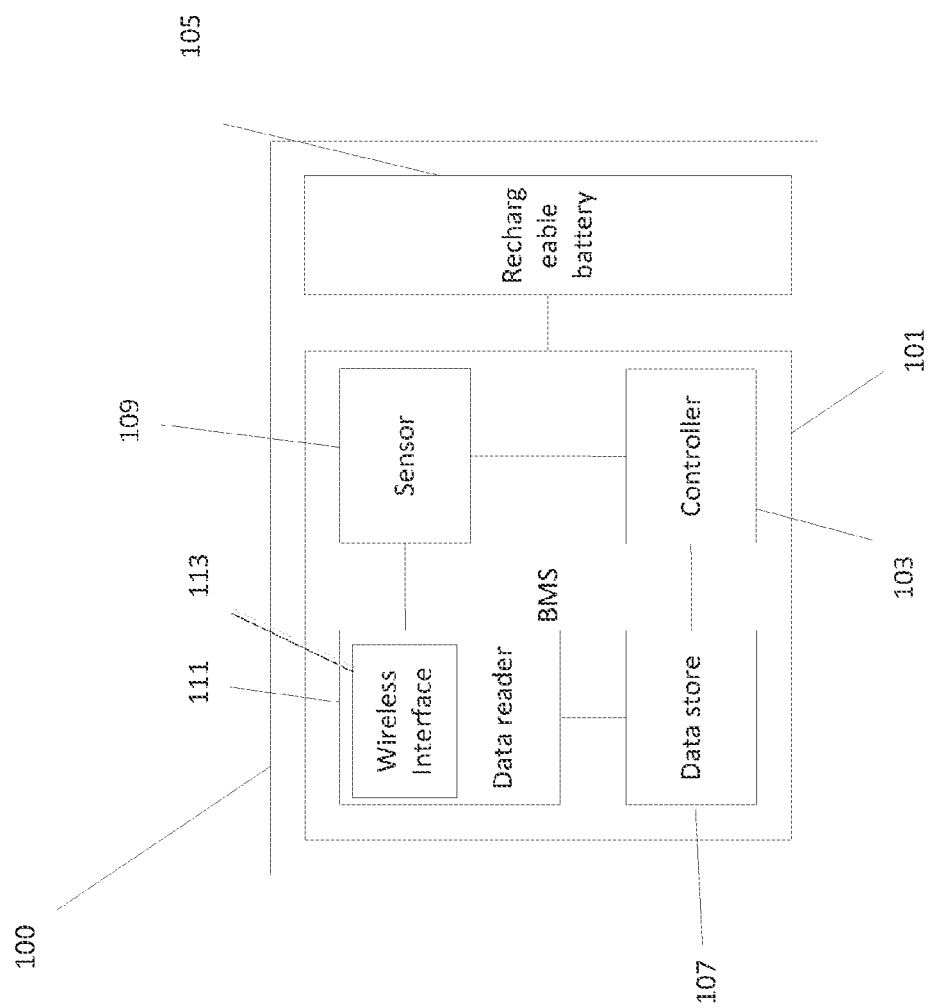
FIG. 1 shows a schematic view of a rechargeable battery pack comprising an example battery management system.

An example BMS according to such embodiments of the disclosure is shown in FIG. 1. FIG. 1 shows a rechargeable battery pack 100 comprising a BMS 101 and a rechargeable battery 105. Such a BMS 101 may comprise a controller 103 coupled to a sensor 109 and a data store 107. The data store 107 and the sensor 109 are coupled to a data reader 111, but in some examples the data store 107 comprises the data reader 111. The data reader 111 may comprise a wireless interface 113. The controller 103 is powered by a first power supply such as the rechargeable battery 105. The data store 107 is operable to be powered by an auxiliary power supply separate from the primary power supply and which bypasses the controller 103. The auxiliary power supply may be provided, for example, by an electromagnetic signal, for example by an inductive or capacitive coupling provided by the wireless interface 113, such as by a near field RF communicator, for example an RFID or NFC interface.

The data store 107 may store information regarding parameters of the rechargeable battery 105, such as number of charge cycles, temperature, battery cell voltage or charge current, as measured by the sensor 109. If the rechargeable battery 105 is exhausted or damaged, for example, the parameters stored in the data store 107 may still be read because the data reader 111 can be powered by the auxiliary power supply. This may be useful in determining a cause of damage to the rechargeable battery 105, for example.

FIG. 1 shows a battery pack 100 having a BMS 101. The BMS 101 is arranged on a printed circuit board that is coupled to a rechargeable battery 105 which serves as the primary power supply. The rechargeable battery 105 comprises at least one LiFePO$_4$ cell. The BMS 101 shown in FIG. 1 comprises a sensor 109 and a data store 107, both coupled to the controller 103. In the example shown the data store is an electrically erasable programmable read only memory (EEPROM), although other types of nonvolatile memory may be used. The sensor 109 may comprise a current sensor, a voltage sensor or a temperature sensor, for example. A data reader 111 comprising a wireless interface 113 is coupled to the data store 107. In the example shown in FIG. 1, the wireless interface 113 comprises an RFID interface, although as noted above, in other examples the wireless interface 113 may comprise other types of near field communication interfaces, such as NFC, an inductive coupler or a capacitive coupler.

Because the BMS 101 is provided on the printed circuit board which is separate to the rechargeable battery 105, the data reader 111, the wireless interface 113 and the data store 107 are physically isolated from the rechargeable battery 105. Although not illustrated in FIG. 1, in some examples the controller 103 may be located on a different part of the printed circuit board to the data store 107, the data reader 111 and the wireless interface 113, so that these components are physically isolated from the controller 103. Because these components of the BMS 101 are physically isolated from the controller 103, data can still be read from the data store 107 even if the controller is damaged or malfunctioning.

The controller 103 is operable to be powered by the rechargeable battery 105, and the data reader 111 is operable to be powered by an auxiliary power supply. The data reader 111 can read data held by the data store 107. The sensor 109 is configured to provide a sensor signal relating to at least one parameter of the rechargeable battery 105. The BMS 101 is configured to control aspects of the rechargeable battery 105, for example the current to and/or from cells of the rechargeable battery 105. The controller 103 is configured to write data to the data store 107 based on the sensor signal.

For example, the controller 103 is configured to write information relating to at least one of: temperature of the battery 105, indication of level of charge of the battery 105, charging current to the battery 105 and voltage of the battery 105 to the data store 107 based on the sensor signal.

In the example shown in FIG. 1, the wireless interface 113 provides an auxiliary power coupling for providing the auxiliary power supply to the data reader 111. The auxiliary power supply bypasses the controller 103.

In use, the controller 103 receives sensor signals from the sensor 109. The controller 103 writes data to the data store 107 based on the sensor signals.

To read data from the data store 107, a user communicates with the wireless interface 113 via an electromagnetic signal. The electromagnetic signal may be produced by a handheld NFC device, for example. The electromagnetic signal powers the data reader 111. The data reader 111 reads data held by the data store 107, and returns a signal to the handheld NFC device so that the user can read parameters of the rechargeable battery 105 stored by the data store 107.

In the example shown in FIG. 1, the data reader 111 comprises the wireless interface 113, but in other examples the wireless interface 113 may be separate to the data reader 111. The wireless interface 113 may further comprise an antenna coupled to the wireless interface 113. For example, the antenna may be located on a different part of the BMS 101.

The BMS 101 may also comprise power circuitry, for instance a power controller 115 (as described below in relation to FIG. 3) comprising a power field effect transistor (FET), a power coupling to the battery 105, electrical terminals for charging the battery 105 and/or the controller 103. The power circuitry may be configured to control current and/or voltage to and/or from the rechargeable battery 105 and/or the controller 103.

In one example (not shown), a BMS 101 is arranged on a printed circuit board and comprises a wireless interface 113, and an optional data store 107 (such as an EEPROM), located in one region of a printed circuit board of the BMS 101, for example in one corner of the printed circuit board. The BMS 101 also comprises a power controller 115 and a CAN interface located on an opposite region of the printed circuit board of the BMS 101, for example in an opposite corner of the printed circuit board. A controller is located between and electrically coupled to the power controller 115 and the CAN interface in one region, and the wireless interface 113 and the data store 107 in the other region.

Positioning these components on different regions of the printed circuit board may physically isolate them from each other, and may, for example, inhibit interference experienced by the wireless interface 113 from the power circuitry. In some examples, components of the BMS 101 may be galvanically isolated from each other. For example, the CAN interface may operate at a high voltage, and so may be galvanically isolated from the controller 103, the power controller 115, the data store 107, the data reader 111 and/or the wireless interface 113.

In some examples, different components of the BMS 101 may be located on different circuit boards. For example, the controller 103 may be on a different circuit board to the wireless interface 113 and/or an antenna of the wireless interface 113. In some examples, components of the BMS 101 may be located on different surfaces of a circuit board. For example, the wireless interface 113 may be located on a different surface to the power circuitry. Positioning components of the BMS 101 on different circuit boards or on different surfaces of a circuit board, so that they are physically isolated, may help reduce any potential electrical interference caused by the power circuitry.

In some examples the antenna of the wireless interface 113 (if present), the data store 107 and/or the data reader 111 may be positioned elsewhere than on the BMS 101. Positioning the antenna, the data store 107 and/or data reader 111 elsewhere than on the BMS 101 may further physically isolate them from the rechargeable battery 105 and associated power circuitry used to charge the battery 105 and reduce any potential electrical interference caused by the power circuitry.

Other embodiments of the disclosure also relate to a BMS which records data to a data store based on a comparison with a threshold condition.

Figure 2:
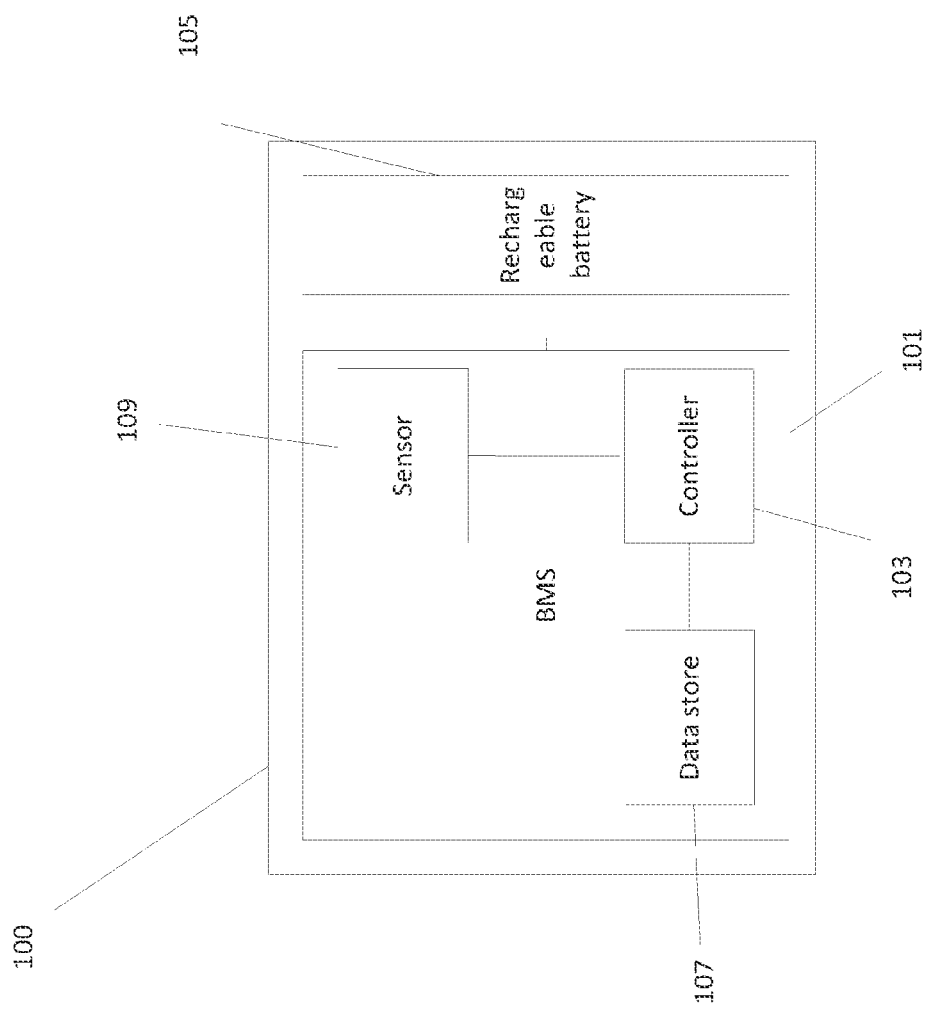
FIG. 2 shows a schematic view of a rechargeable battery pack comprising an example battery management system.

An example BMS according to such embodiments of the disclosure is shown in FIG. 2. FIG. 2 shows a rechargeable battery pack 100 comprising a BMS 101 and a rechargeable battery 105. Such a BMS 101 may comprise a controller 103 coupled to a sensor 109 and a data store 107. The sensor 109 may be a current sensor, a voltage sensor or a temperature sensor, for example. The controller 103 is configured to receive sensor signals from the sensor 109 and determine whether to write data to the data store 107 based on a comparison with a threshold condition. In determining whether to write data to the data store 107, the controller 103 reads a reference from a memory and compares the sensor signal to the reference. The controller 103 may write data to the data store 107, for example if the sensor signal is less than or greater than a selected value, for example if a temperature, a cell voltage or a current is less than or greater than a selected value. The controller 103 may therefore only write data to the data store 107 if it is greater than or less than a previously recorded value.

FIG. 2 shows a battery pack 100 comprising a BMS 101 arranged on a printed circuit board. The BMS 101 is coupled to a rechargeable battery 105. The rechargeable battery 105 comprises at least one $LiFePO_4$ cell. The BMS 101 comprises a sensor 109 and a data store 107. The sensor 109 and data store 107 are coupled to the controller 103. The sensor 109 may be a current sensor, a voltage sensor or a temperature sensor, for example.

The BMS 101 is configured to control aspects of the rechargeable battery 105, for example the current to and/or from cells of the rechargeable battery 105. The sensor 109 is configured to provide a sensor signal relating to at least one parameter of the rechargeable battery 105. The controller 103 is configured to compare the sensor signal to a threshold condition; and determine whether to write data to the data store 107 based on the comparison with the threshold condition.

In use, the controller 103 receives sensor signals from the sensor 109. The controller 103 compares the received sensor signals to a threshold condition and determines whether to write data to the data store 107 based on the comparison with the threshold condition.

In the example shown in FIG. 2, the threshold condition comprises a state of charge of the battery falling below a threshold. In other examples, or in addition to the threshold condition comprising a state of charge of the battery falling below a threshold, the threshold condition may comprise at least one of: a cell voltage greater than 3.6 V, a cell voltage less than 3.0 V, a battery voltage greater than 14.6 V, a battery voltage less than 12.0 V, a charge temperature greater than 45° C., for example greater than 50° C., a charge temperature less than 0° C., a discharge temperature greater than 45° C., for example greater than 50° C., a discharge temperature less than −15° C., a storage temperature greater than 50° C., a storage temperature less than −30° C., a charge current greater than 100 A, and a discharge current greater than 100 A. The threshold condition temperature may be based on the cell chemistry of the battery 105.

In some examples, the BMS 101 comprises a plurality of sensors 109, and each sensor 109 is configured to provide a corresponding sensor signal, for example relating to a different parameter of the rechargeable battery 105. The controller 103 may be configured so that, in response to the controller 103 determining whether to write data to the data store 107 based on the comparison of one sensor signal with the threshold condition, the controller 103 writes data relating to all of the parameters to the data store 107.

In some examples the BMS 101 comprises a memory such as a non-volatile memory, for example an EEPROM. In some examples, the data store 107 may comprise the memory. In determining whether to write data to the data store 107, the controller 103 may read a reference from the memory and compare the sensor signal to the reference.

In some examples, a previous value of the sensor signal recorded to the data store 107 provides the threshold condition. For example, a previously written value of at least one parameter recorded to the data store 107 may provide the threshold condition.

Writing data to the data store 107 may comprise overwriting a previous value of the at least one parameter that may be stored in the data store 107.

The controller 103 may be configured to select a threshold condition depending on at least one of (i) whether the rechargeable battery pack 100 is being charged, (ii) whether the rechargeable battery pack 100 is being discharged and (iii) whether the rechargeable battery pack 100 is being stored. The controller 103 may determine that the rechargeable battery pack 100 is being charged, discharged or stored depending on a sensor signal indicating a current to and/or from a cell of the rechargeable battery 105. For example, the controller 103 may determine that the rechargeable battery 105 is being stored based on the current not flowing to and/or from the rechargeable battery 105, for example a cell of the rechargeable battery 105, for a selected time interval. Additionally or alternatively, the controller 103 may determine that the rechargeable battery 105 is being stored in the event that a current and/or voltage supplied to and/or drawn from the rechargeable battery 105 is less than a selected threshold level for more than a selected time interval.

In some examples the battery pack 100 comprises a controller area network, CAN, interface coupled to the BMS 101. The controller 103 may be configured to communicate over the CAN, and the controller 103 may be configured to set the threshold condition based on information received via the CAN. Additionally or alternatively, in some examples, the threshold condition may be programmable via the wireless interface 113, and the controller 103 may be configured to set the threshold condition based on information received via the wireless interface 113. In this way, the threshold condition may be programmable by a user or a manufacturer prior to shipping the battery pack.

Figure 3:
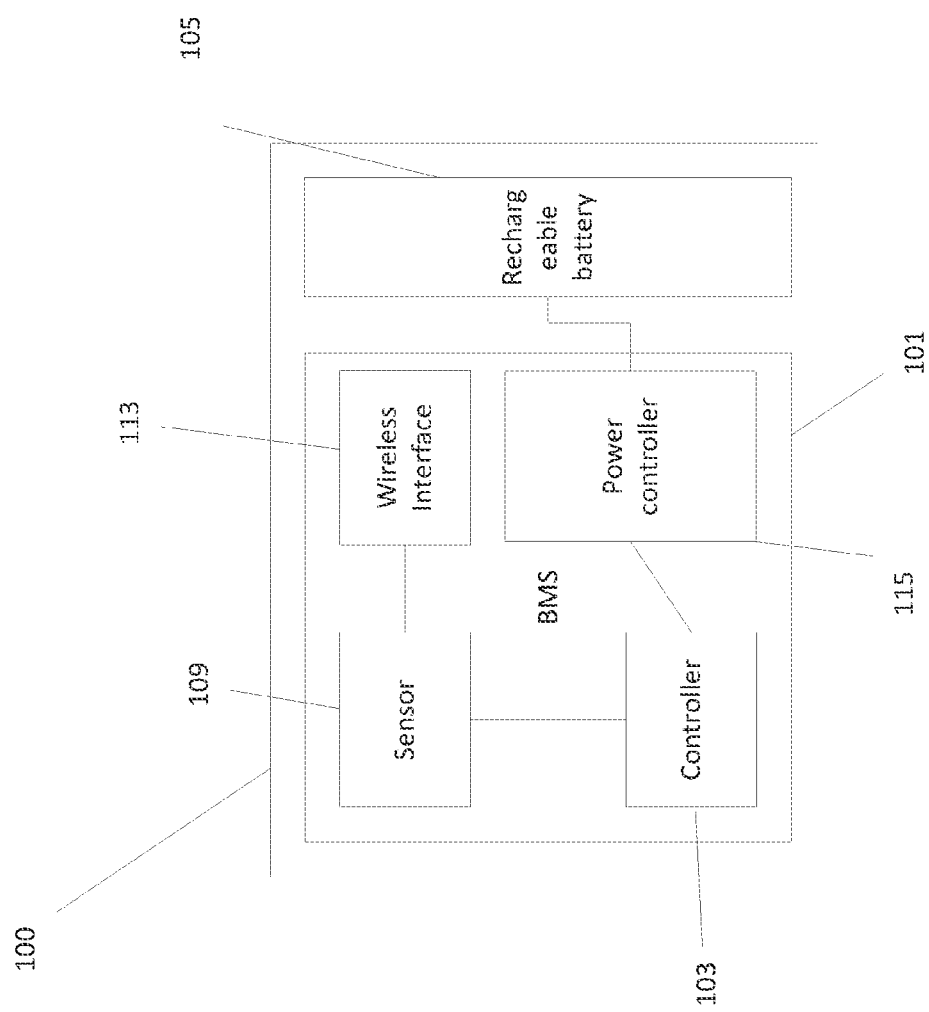
FIG. 3 shows a schematic view of a rechargeable battery pack comprising an example battery management system.

Other embodiments of the disclosure also relate to a BMS, for example that powers down different sets of components depending on whether different sets of conditions are met, as shown in FIG. 3.

An example BMS according to such embodiments is shown in FIG. 3. Such a BMS 101 comprises a controller 103 coupled to at least one sensor. The at least one sensor provides sensor signals to the controller 103. The controller 103 is configured to monitor the sensor signals and powers down a first set of components of the BMS 101, such as a wireless interface 113, in response to the sensor signals reaching and/or exceeding a first threshold condition, and a second set of components, such as a power controller 115 (as described below in relation to FIG. 3), in response to the sensor signals reaching and/or exceeding a second threshold condition.

FIG. 3 shows a rechargeable battery pack 100 comprising a BMS 101 arranged on a printed circuit board. The BMS 101 is coupled to a rechargeable battery 105. The rechargeable battery 105 comprises at least one LiFePO$_4$ cell. The BMS 101 comprises a controller 103 coupled to a sensor 109. The controller 103 is also coupled to a network interface 113, such as a CAN interface, and a power controller 115. The sensor 109 may be a current sensor, a voltage sensor or a temperature sensor, for example.

The sensor 109 is configured to provide a sensor signal to the controller 103. The controller 103 is configured to communicate over a network via the network interface 113. For example, the controller 103 may be configured to send and/or receive instructions over the network via the network interface 113. For example, the controller 103 may be configured to write data to a data store 107 via the network interface 113.

The controller 103 is also configured to operate the power controller 115. The power controller 115 is operable by the controller 103 to control aspects of the battery 105. For example, the power controller 115 is operable to control current drawn from cells of the rechargeable battery 105.

In response to the sensor signal meeting a first condition, the controller 103 is configured to power down a first set of components of the BMS 101, and in response to the sensor signal meeting a second condition, the controller 103 is configured to power down a second set of components of the BMS 101. In the example shown in FIG. 3, the first set of components comprises the network interface 113, and the second set of components comprises the power controller 115.

In some examples, a different controller is configured to power down the first and second sets of components of the BMS 101. For example, an analogue logic such as an analogue front end may be configured to, in response to the sensor signal meeting a first condition, power down a first set of components of the BMS 101, and in response to the sensor signal meeting a second condition, power down a second set of components of the BMS 101. In such examples, the first and/or second set of components of the BMS 101 may comprise the controller 103. Such an analogue front end may implement safety functions. For example, the analogue front end may make cell voltage measurements and reduce or cut off current and/or voltage in overcurrent, overvoltage and undervoltage situations. An analogue front end may comprise a controller such as a microcontroller.

In use, the controller 103 receives sensor signals relating to a parameter or parameters of the rechargeable battery 105 from the sensor 109. The controller 103 monitors the sensor signals, and in response to a sensor signal meeting a first condition, the controller 103 powers down a first set of components of the BMS 101 (in this example, the first set of components comprising the network interface 113). In response to a sensor signal meeting a second condition, the controller 103 is configured to power down a second set of components of the BMS 101 (in this example, the second set of components comprises the power controller 115).

In some examples, the first set of components may comprise components other than or in addition to the network interface 113. For example, the first set of components may comprise a data store 107 (such as an EEPROM) or the controller 103 (for example where the BMS 101 comprises an analogue front end). In some examples, the second set of components may comprise components other than or in addition to the power controller 115.

As with the examples described above in relation to FIGS. 1 and 2, in some examples the battery pack 100 comprises a controller area network, CAN, interface coupled to the BMS 101. The network interface 113 may comprise the CAN interface. The controller 103 may be configured to communicate over the CAN. For example, the controller 103 may be configured to write data relating to the at least one parameter to a data store 107 via the CAN.

In some examples, the controller 103 is configured to compare the sensor signal to a reference to determine whether the sensor signal meets the first and/or second condition based on the comparison with the reference.

The condition may be the threshold condition described above in relation to FIG. 2. For example, the condition may comprise a state of charge of the battery 105 (for example, the voltage of a cell of the battery 105) falling below a threshold. The condition may comprise at least one of: a cell voltage greater than 3.6 V, a cell voltage less than 3.0 V, a battery voltage greater than 14.6 V, a battery voltage less than 12.0 V, a charge temperature greater than 45° C., for example greater than 50° C., a charge temperature less than 0° C., a discharge temperature greater than 45° C., for example greater than 50° C., a discharge temperature less than −15° C., a storage temperature greater than 45° C., for example greater than 50° C., a storage temperature less than −30° C., a charge current greater than 100 A, and a discharge current greater than 100 A. Again, the threshold condition temperature may be based on the cell chemistry of the battery 105.

As with the example described above in relation to FIG. 2, the controller 103 may be configured to select a threshold condition depending on at least one of (i) whether the rechargeable battery pack 100 is being charged, (ii) whether the rechargeable battery pack 100 is being discharged and (iii) whether the rechargeable battery pack is being stored.

Figure 4:
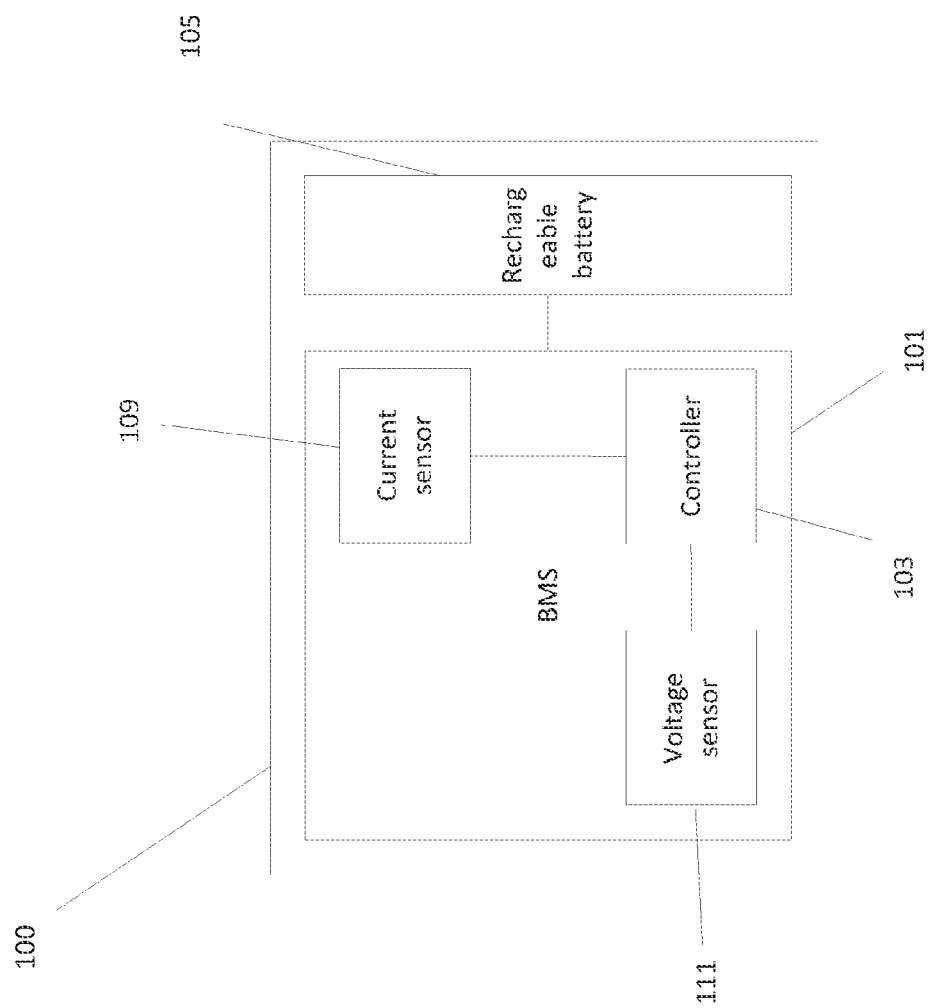
FIG. 4 shows a schematic view of a rechargeable battery pack comprising an example battery management system.

Other embodiments of the disclosure also relate to a BMS, that operates in a low power mode (or "storage mode") if the battery has not been used for a while, as shown in FIG. 4.

An example BMS according to such embodiments of the disclosure is shown in FIG. 4. Such a BMS 101 comprises a controller 103 coupled to at least one sensor. The at least one sensor provides sensor signals to the controller 103. The controller 103 is configured to monitor the sensor signals and powers down components of the BMS 101, such as a wireless interface 113 or a power controller 115, in response to the sensor signal indicating that a certain parameter relating to the battery 105, such as current or voltage, has not changed between selected intervals.

FIG. 4 shows a rechargeable battery pack 100 comprising a BMS 101 coupled to a rechargeable battery 105. The BMS 101 comprises a controller 103 coupled to a current sensor 109 and a voltage sensor 111, although in other examples the BMS 101 may only comprise a current sensor 109 or a voltage sensor 111.

The BMS 101 is configured to be powered by the rechargeable battery 105. The BMS 101 is configured to control aspects of the rechargeable battery 105, for example the current to and/or from cells of the rechargeable battery 105.

The current sensor 109 is configured to provide a current sensor signal to the controller 103 relating to the current supplied to and/or drawn from the rechargeable battery 105. The voltage sensor 111 is configured to provide a voltage sensor signal to the controller 113 relating to the voltage supplied to and/or drawn from the rechargeable battery 105.

The controller 103 is configured to operate the BMS 101 in a low power mode in the event that the current and/or voltage is less than a selected threshold level for more than a selected time interval.

In use, the controller 103 receives sensor signals relating to a parameter or parameters of the rechargeable battery 105 from the sensor 109. The controller 103 monitors the sensor signals, and compares the sensor signal to a reference at intervals. The controller 103 determines whether to operate the BMS 101 in a low power mode based on the comparison with the reference in response to the sensor signal indicating that the current and/or voltage to and/or from the battery 105 has not changed between intervals. An example interval may be a minute, but other examples may include 30 seconds, 10 minutes, 30 minutes, an hour, two hours or more.

The low power mode comprises reducing the power supplied to at least one component of the BMS 101. For example, the low power mode comprises powering down at least one component of the BMS 101. The components powered down may be those described above in relation to FIG. 3. For example, the BMS may comprise a wireless interface 113 and/or a power controller 115, and the controller may power down the wireless interface 113 and/or the power controller 115 in the low power mode.

In response to the BMS 101 drawing a current from the battery 105, the controller 103 is configured to exit the low power mode. Exiting the low power mode involves powering up whatever components of the BMS 101 that may have been powered down.

In the example shown in FIG. 4, in response to the received current and/or voltage signals indicating that the current and/or voltage to and/or from the battery 105 has not changed by a threshold for a second selected time period, the controller 103 is configured to operate in a second low power mode. In the example shown in FIG. 4, the second low power mode comprises powering down the controller 103. The second low power mode also comprises powering up the controller 103 at intervals to listen for a change in the current and/or voltage supplied to and/or drawn from the battery 105.

In some examples, the rechargeable battery 105 comprises a plurality of cells and at least two terminals, and the low power mode comprises disconnecting at least one of the plurality of cells from the at least two terminals.

In some examples, the low power mode comprises powering the controller 103 by an auxiliary power supply.

In some examples, the at least one component comprises at least one of: the at least one sensor 109, 111, the controller 103, a power controller 115 such as a power integrated controller, IC, balancing components for balancing charge in cells of the battery 105 and a timer.

In some examples, the low power mode and/or the second low power mode comprises switching off the power controller 115, for example FETs. The second low power mode may comprise using at least one pull-down resistor so that in the absence of power the power circuitry, such as the gates of the FETs of the power controller 115, may be automatically pulled down to provide a high resistance.

As described above in relation to FIG. 3, in some examples, a different controller is configured to power down the components of the BMS 101 than controller 103. For example, an analogue logic such as an analogue front end may be configured to power down components of the BMS 101.

Figure 5:
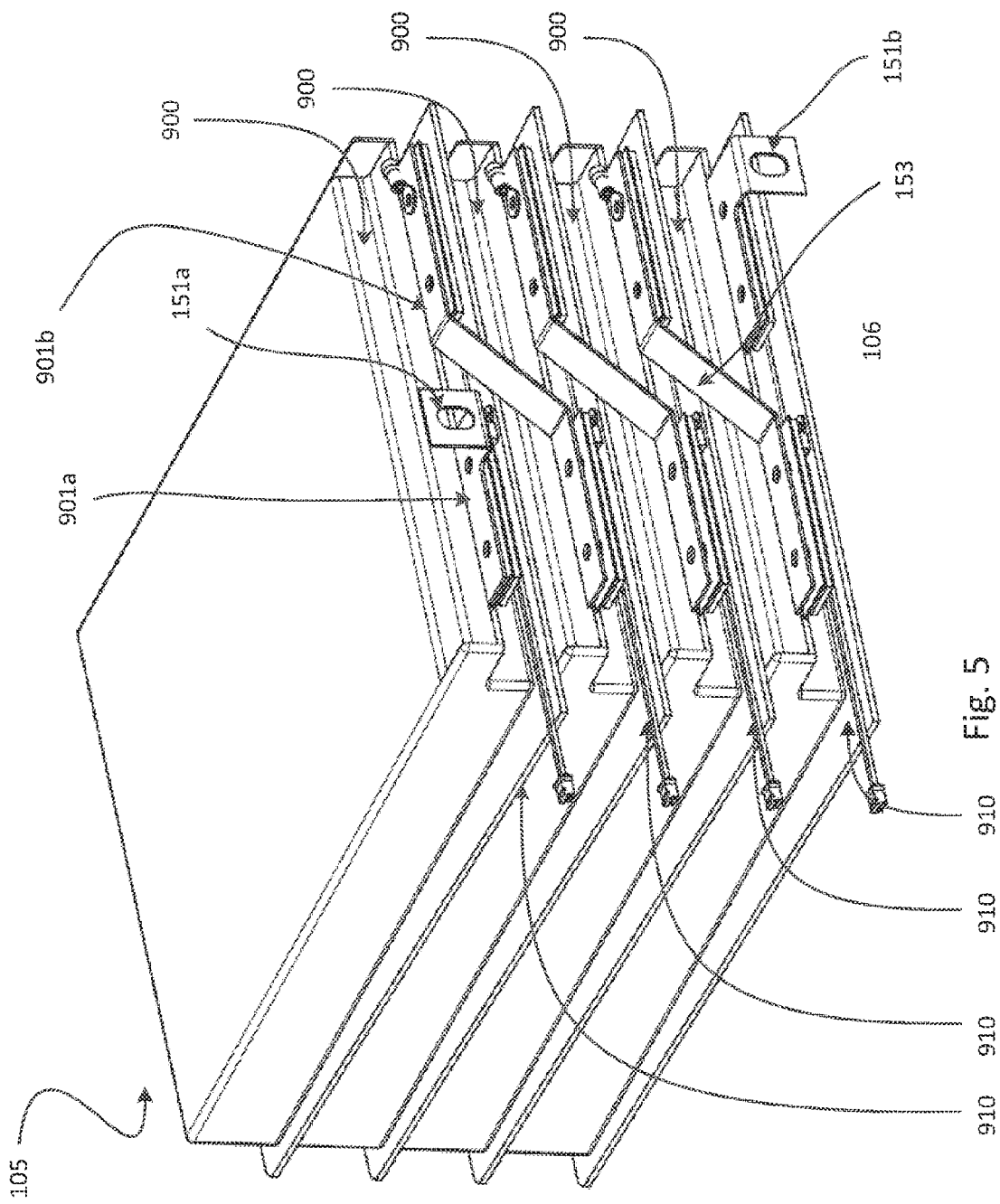
FIG. 5 shows a perspective view of a stack of battery cells for an example rechargeable battery.
Figure 6:
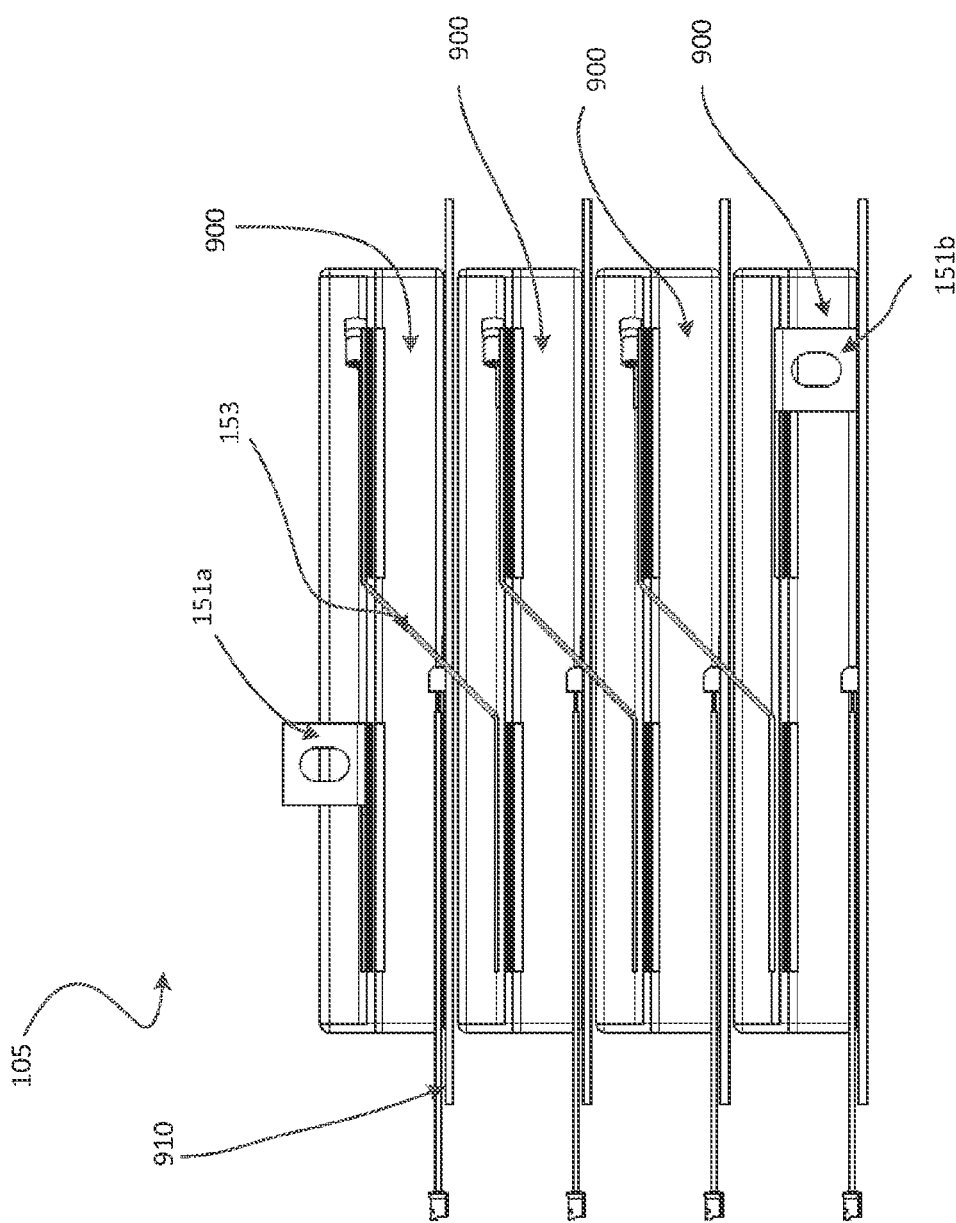
FIG. 6 shows an end view of the stack of battery cells of FIG. 5.
Figure 7:
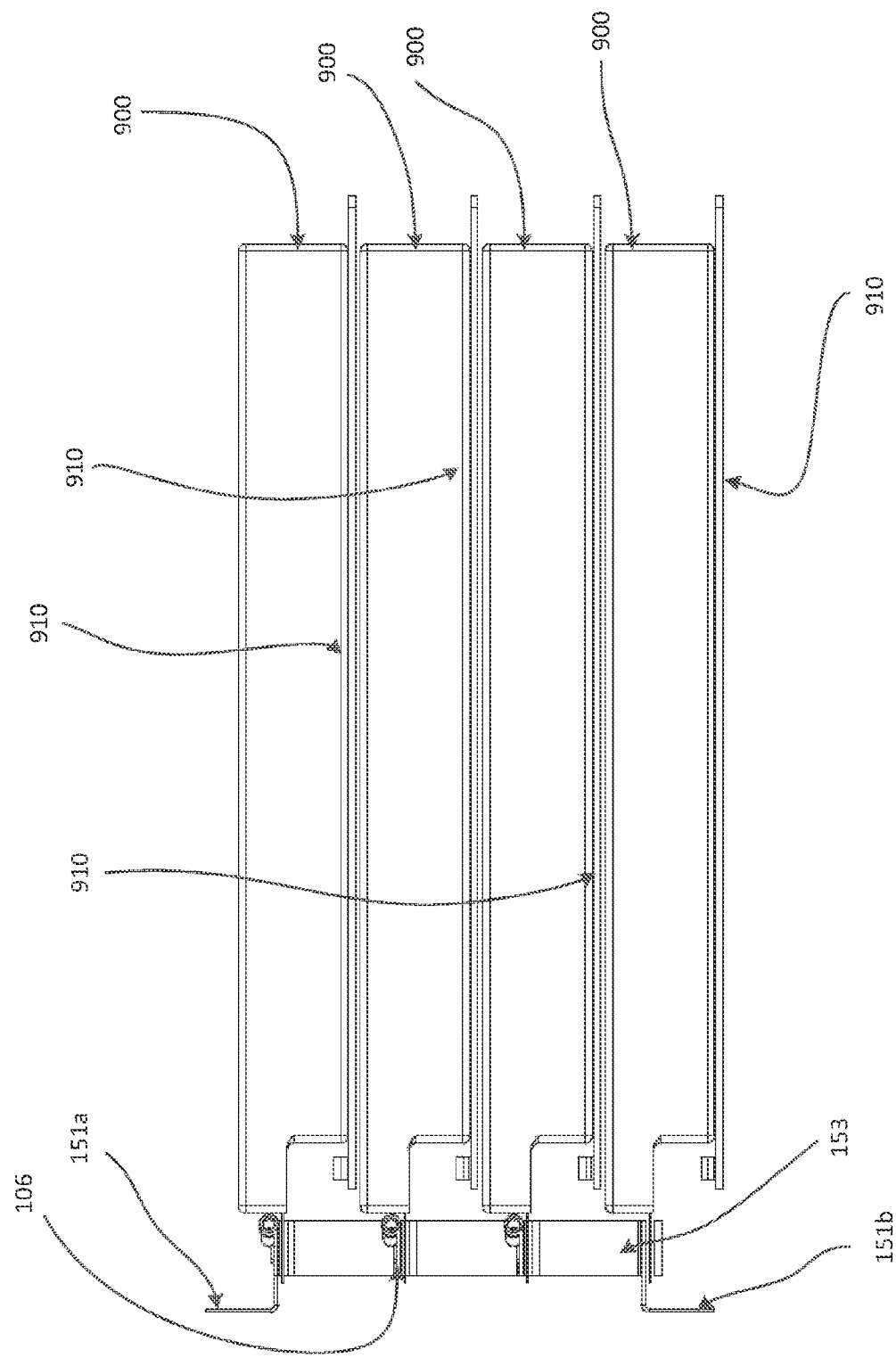
FIG. 7 shows a side view of the stack of battery cells of the rechargeable battery pack of FIG. 5.

Other embodiments of the disclosure relate to an enclosure for a rechargeable battery, for example an enclosure for a rechargeable battery comprising a BMS as shown in FIGS. 5 to 9. Such an enclosure may comprise a rechargeable battery 105 (as shown in FIGS. 5 to 7), with the enclosure forming a battery pack when assembled. The battery 105 may comprise a number of cells 900, and the enclosure 200 may be configured so that the spacing between cells 900 is sufficient to allow a convection air current to flow therebetween, for example to reduce the likelihood of the cells 900 overheating during charge or discharge.

The enclosure 200 may also be configured so that the cells 900 are securely held in place when the battery pack is assembled, and so that movement may occur between a BMS 101 coupled to the battery 105 and the enclosure 200, but so that movement is inhibited between the cells 900 and the BMS 101.

FIGS. 5 to 9 show an enclosure 200 providing a rechargeable battery pack 100 comprising a BMS 101 coupled to a rechargeable battery 105. The battery 105 comprises a plurality of LiFePO$_4$ cells 900 coupled together in series via the BMS 101. In the example shown in FIGS. 5 to 9, the battery 105 comprises four cells 900, although in other embodiments the battery 105 may comprise more cells 900, for example six cells 900, or fewer cell, for example three cells 900.

As shown in FIGS. 5, 6 and 7 the cells 900 of the battery 105 are arranged in a stacked arrangement. Each cell 900 of the plurality of cells 900 is supported by a respective tray 910. The trays 910 are made from aluminium so as to be thermally conductive yet lightweight, although it will be understood that other thermally conductive materials may be suitable. Each cell 900 is bonded to each tray 910 with thermally conductive adhesive, although in other examples each cell 900 may be coupled to a tray 910 using other means such as conventional adhesive or ultrasound welding.

Each cell 900 has two spaced tabs 901a, 901b on the same end, for electrically coupling to the cell 900. Each cell 900 has a positive polarity tab 901a and a negative polarity tab 901b. Each tab 901a, 901b of each cell 900 is coupled to a tab 901a, 901b of an opposite polarity of an adjacent cell 900 via a copper conductor 153, although other conductive materials may be suitable. Due to the stacked arrangement of the cells 900, the copper conductor 153 coupling the tab 901a, 901b of one cell 900 to a tab 901a, 901b of another cell 900 is arranged in a concertina pattern.

Each cell 900 further has an optional coupling 106 optionally coupled to the BMS 101. The cells 900 at either ends of the stack have a terminal, 151 a and 151 b respectively. In the example shown, the terminals 151a, 151b project beyond an end of the stack of cells 900. One terminal 151a is coupled to a positive polarity tab 901a, and one terminal 151b is coupled to a negative polarity tab 901b. Due to the stacked arrangement, the terminals 151a, 151b are on opposing sides of the stack of cells 900 diagonally across from each other, and are at different points widthways along the battery 105.

Figure 8:
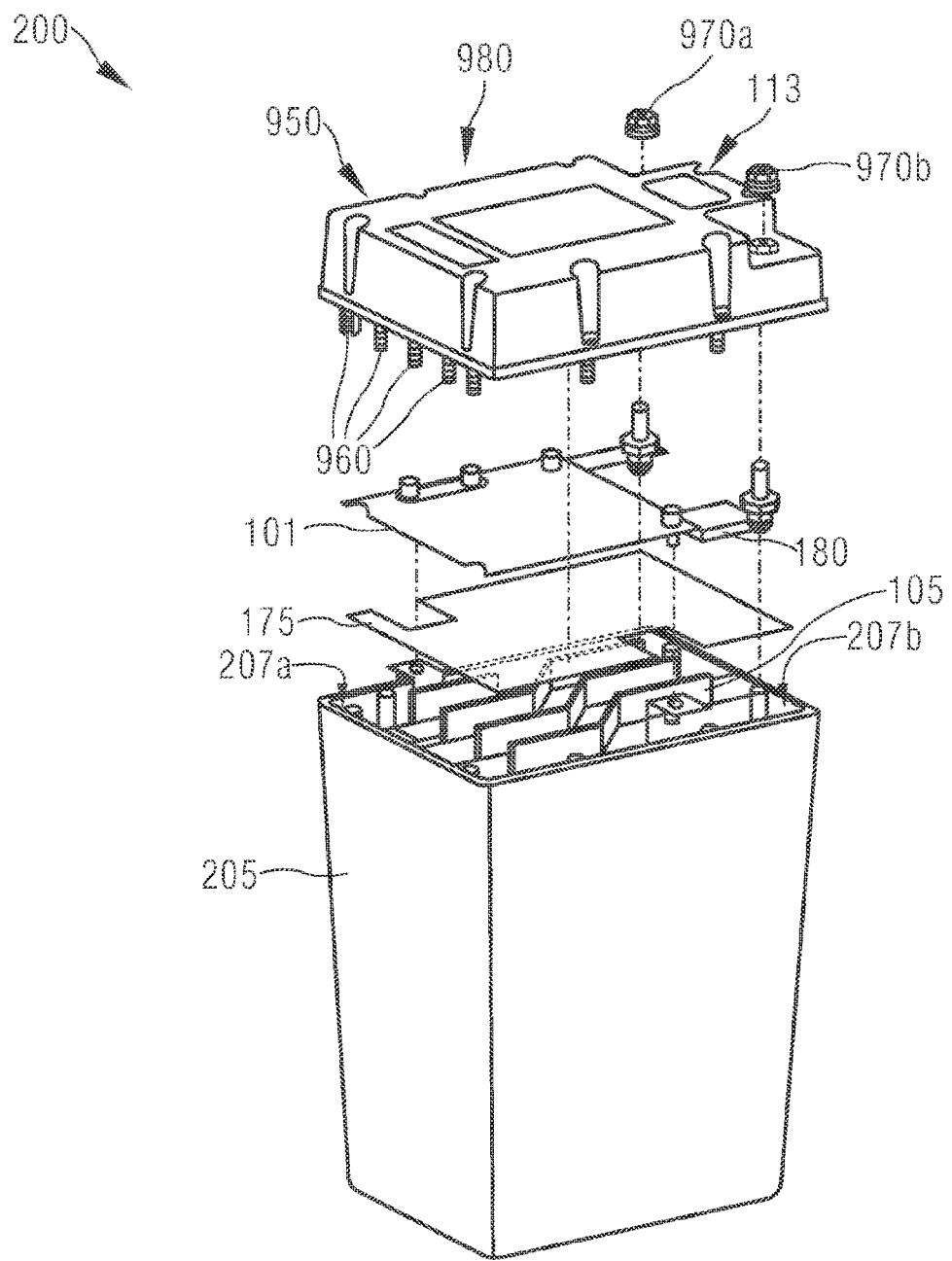
FIG. 8 shows an exploded perspective view of an example enclosure for the rechargeable battery of FIGS. 5 to 7.

As shown in FIG. 8, the enclosure 200 comprises a container 205 and a lid 950. The container 205 is shaped generally in the form of a cuboidal bucket, and has two opposing faces 207a, 207b, each comprising a respective plurality of spaced slots 210. It will be understood that other shapes of container 205 may be suitable that have two opposing faces. The container 205 and the lid 950 are rigid to protect the battery 105 and the BMS 101 and to provide a rigid spacing between slots 210.

Each of the slots 210 of each opposing face 207a, 207b is spaced apart by at least 20 mm, and in the example shown in FIGS. 5 to 9 the spacing (also known as the pitch) is about 119 mm. The container 205 also comprises a flexible seal around one end for creating a seal with the lid 950 when the lid is coupled to the container 205. The bottom of each slot 210 may comprise a soft or resilient member to receive an end of a corresponding tray 210.

The lid 950 comprises a plurality of tabs 960. The tabs 960 are projections from the lid 950. The lid 950 also comprises screws that mate with a corresponding female portion of the container 205 to securely fasten the lid 950 to the container 205, although it will be understood that other insulated or non-insulated fastening means may be used to fasten the lid 950 to the container 205.

The BMS 101 is provided on a circuit board supported by the trays 910. In the example shown in FIGS. 5 to 9, the BMS 101 is rigidly coupled to the trays 910 via the terminals 151a, 151b to inhibit movement of the BMS 101. Between the battery 105 and the BMS 101 is an optional mylar film 175, although in other examples any other insulating film may be used, or no insulating film used.

The BMS 101 also comprises a wireless interface 113 (such as the RFID interface described above in relation to FIG. 1). In the example shown in FIGS. 5 to 9, the wireless interface 113 is an RFID interface and is part of the data store 107, which in this example is an EEPROM. The wireless interface 113 also comprises an antenna (not shown) that extends beyond the data store 107 and, in this example, is etched on the printed circuit board forming part of the BMS 101. The lid 950 comprises a marker (for example a logo such as a NFC logo) on an outer surface that is configured to be above the wireless interface 113 when the lid 950 is attached to the enclosure 200, and the battery pack is assembled. In this way, a user knows where to hold a wireless device such as an NFC device, for example, for it to communicate effectively with the wireless interface 113.

The lid 950 also comprises an optional CAN interface 117 coupled to the BMS 101. The CAN interface 117 is recessed in the lid 950. In some examples, the lid may comprise a different network interface, for instance a serial interface such as an RS485 interface, or an RS 422 or 232 interface. In some examples, the wireless interface 113 may comprise a CAN interface 117.

Additionally, the lid 950 comprises holes for two battery terminals 970a, 970b. When the enclosure 200 is assembled, the terminals 970a, 970b project through the holes but are recessed in the lid 950 so that the terminals 970a, 970b do not project beyond an outer face 980 of the lid 950. The lid 950 also comprises a cavity.

Figure 9:
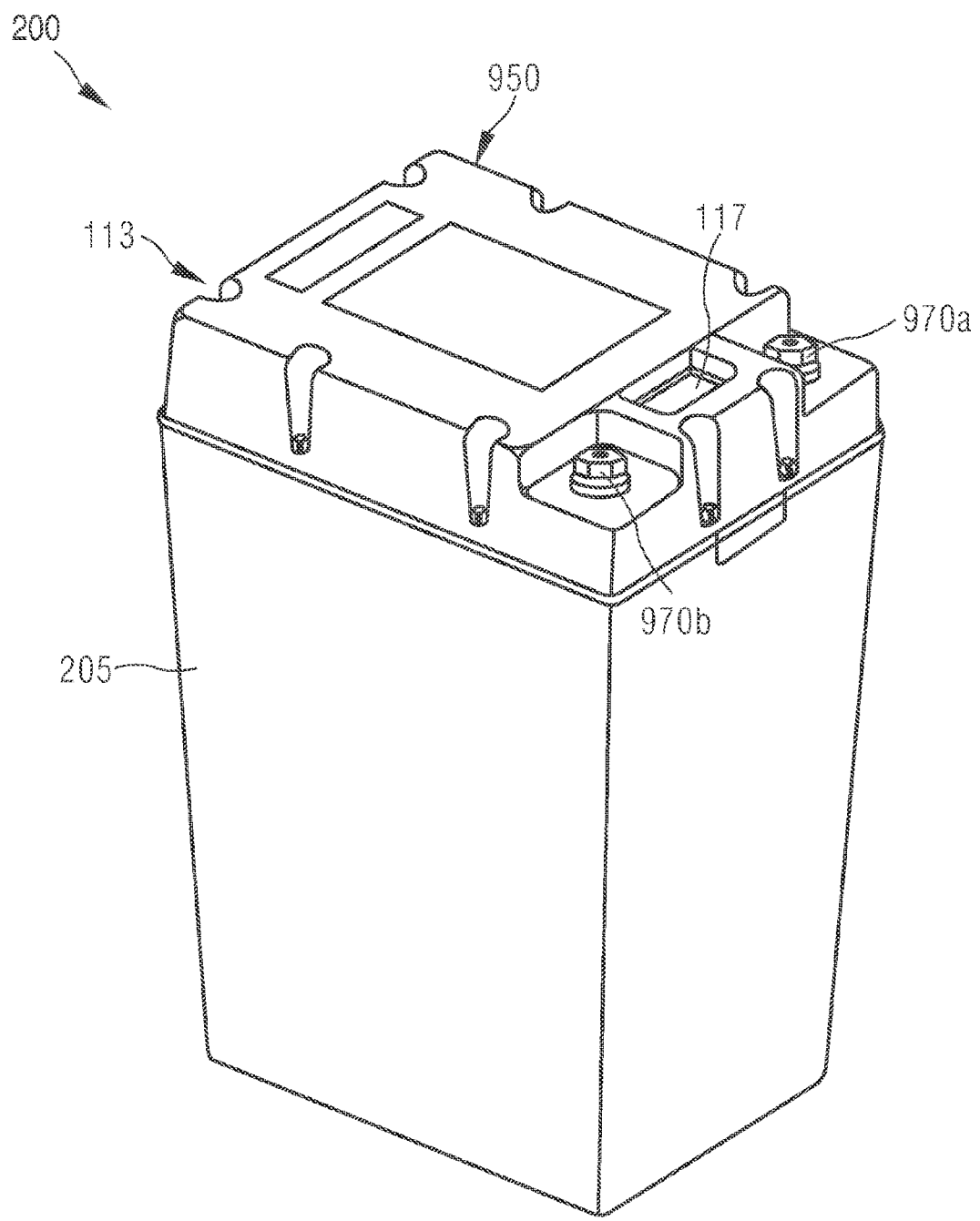
FIG. 9 shows a perspective view of a container comprising the enclosure of FIG. 8.
Figure 10:
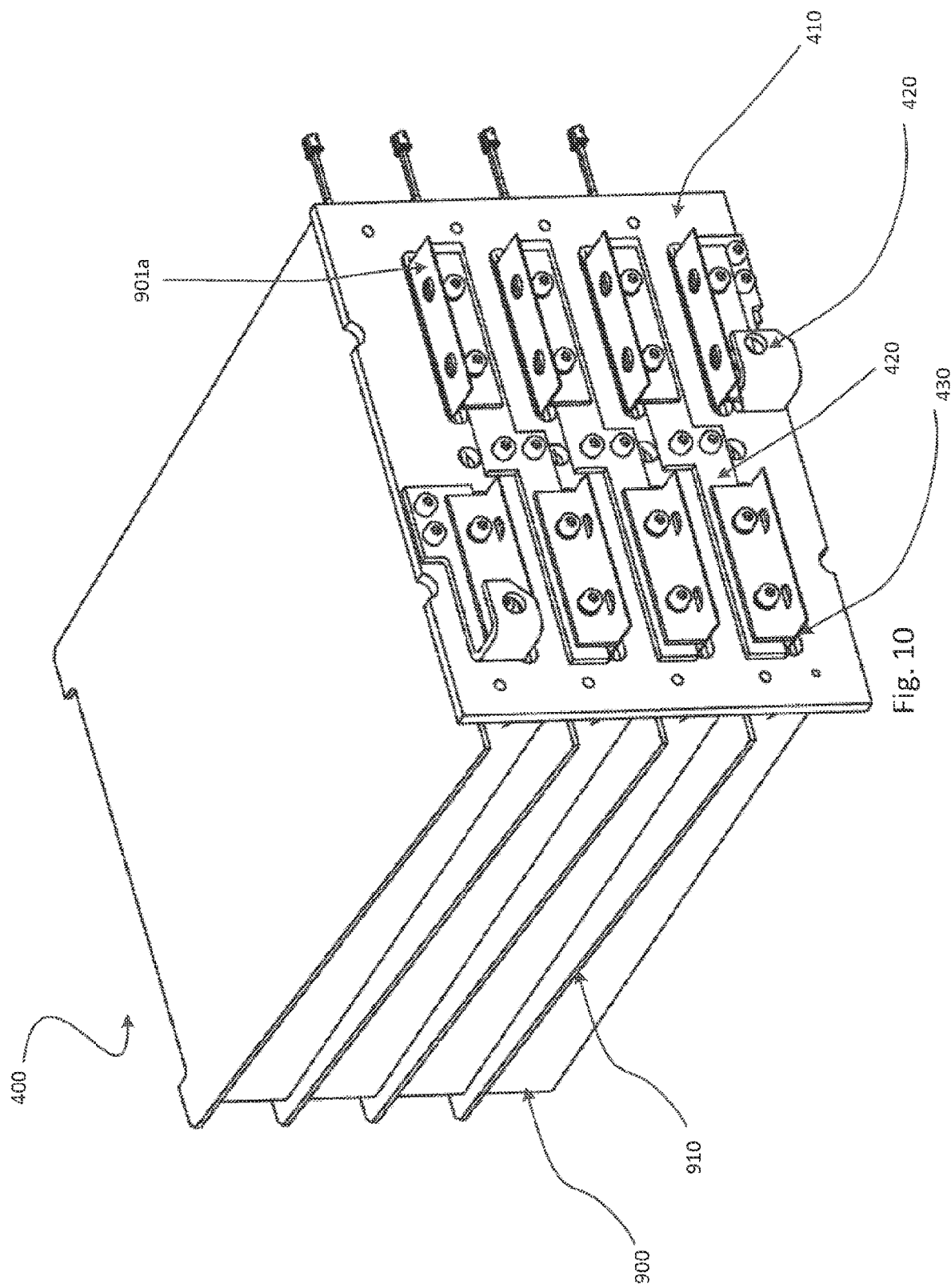
FIG. 10 shows a perspective view of a battery assembly.
Figure 11:
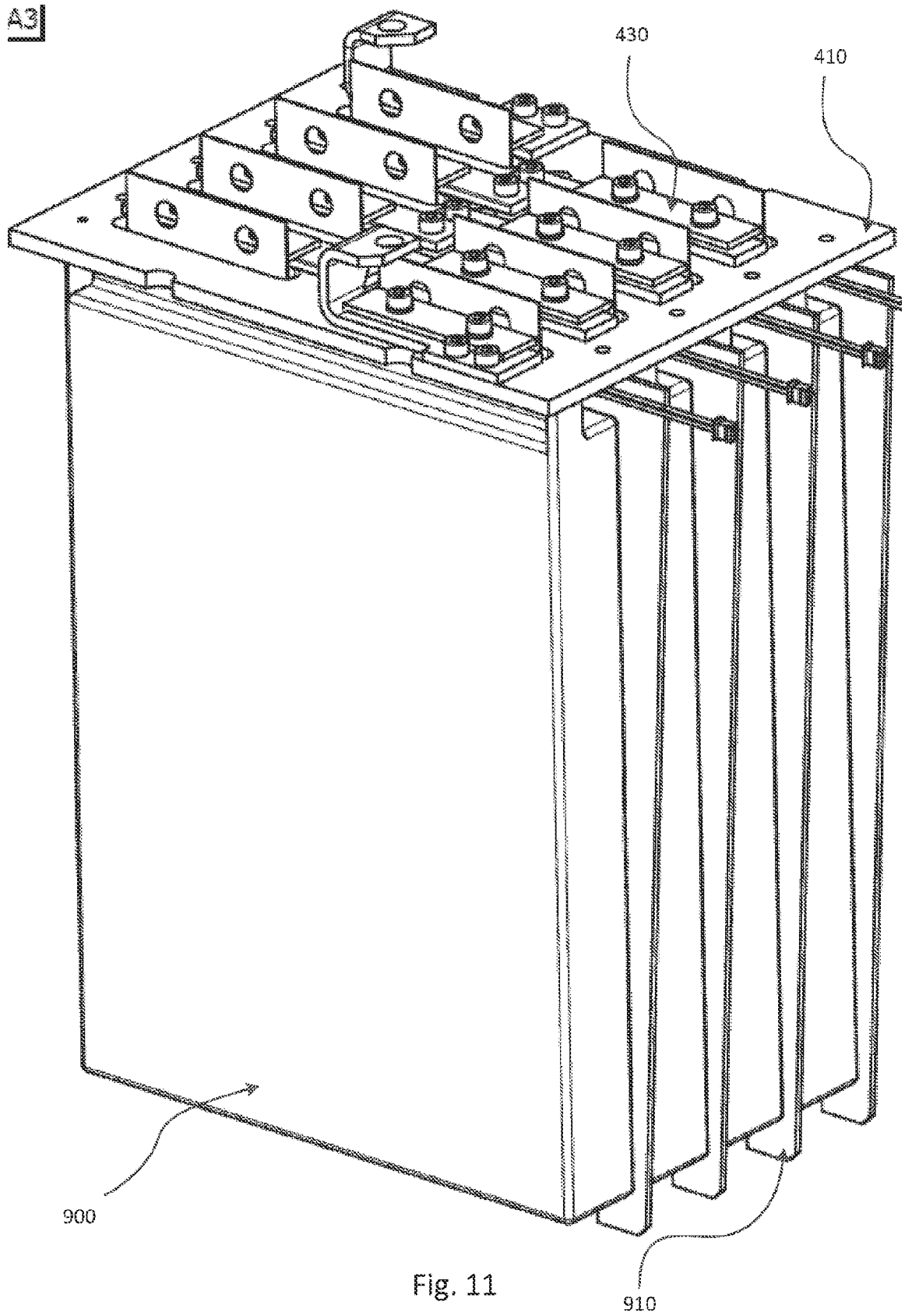
FIG. 11 shows another perspective view of the battery assembly of FIG. 10.
Figure 12:
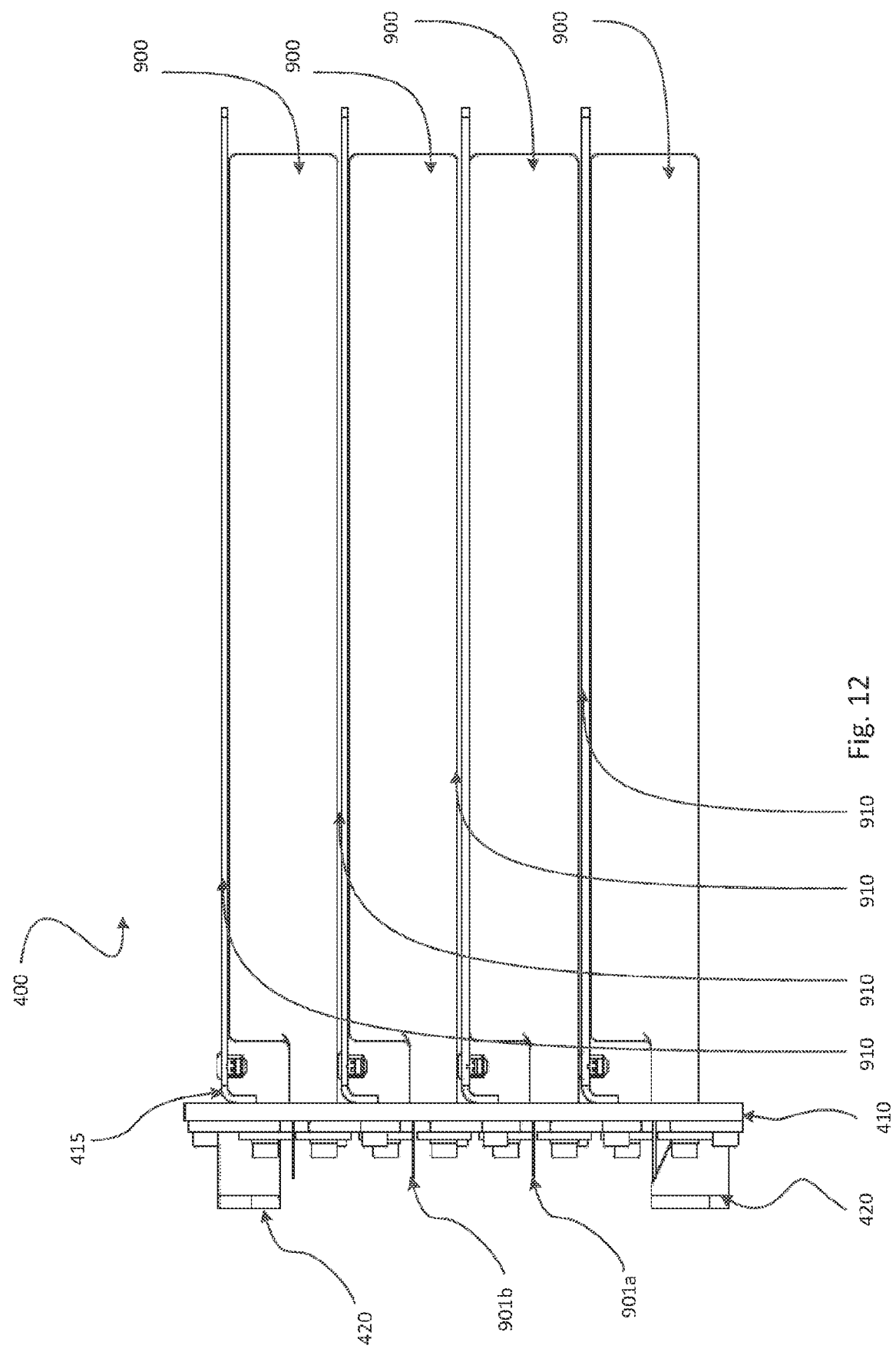
FIG. 12 shows a side view of the battery assembly of FIGS. 10 and 11.
Figure 13:
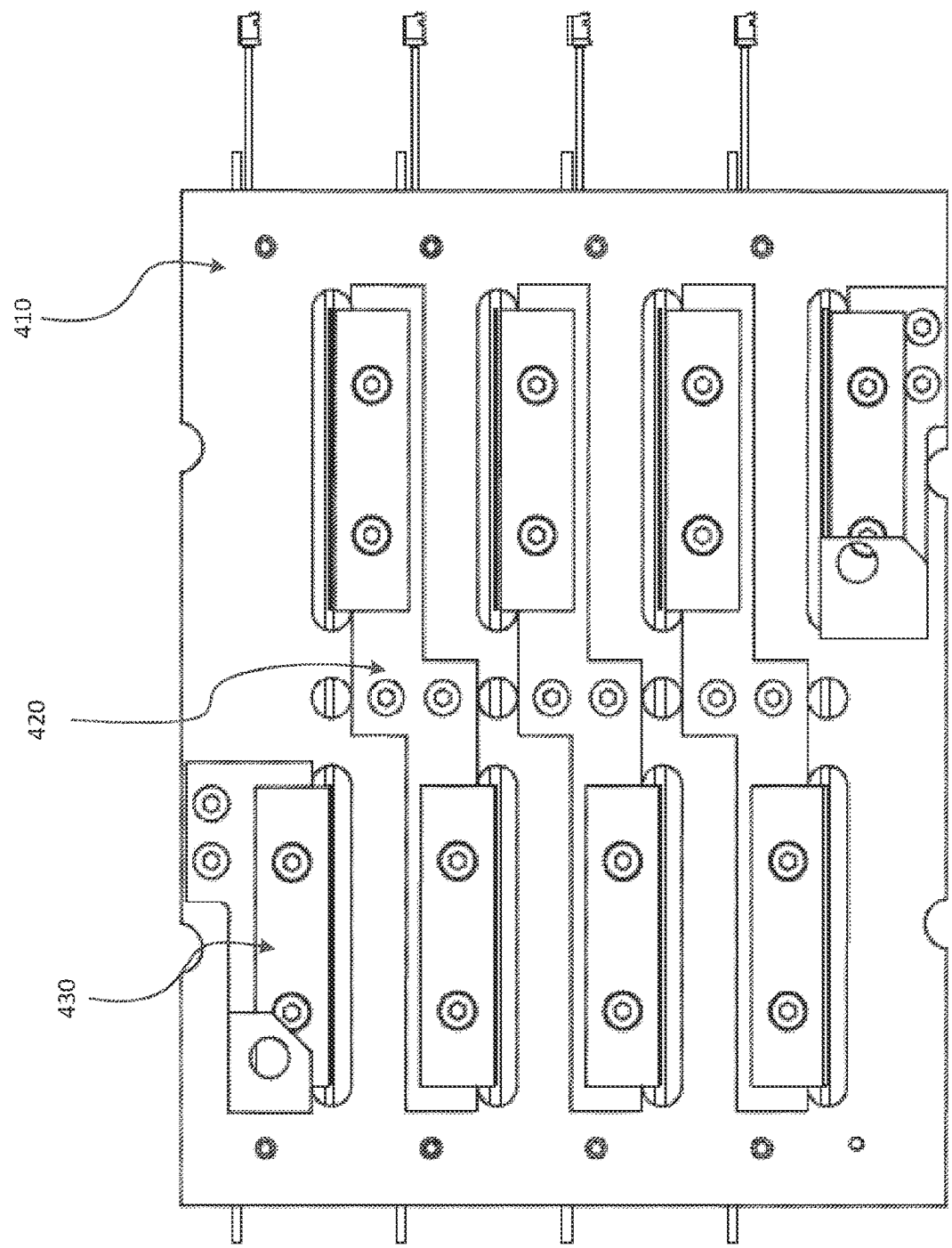
FIG. 13 shows an end view of the battery assembly of FIGS. 10, 11 and 12.

FIG. 8 shows the enclosure 200 comprising a plurality of trays 910 inserted into the slots 210. Each tray 910 comprises a respective cell 900 of the battery 105. FIG. 9 shows the enclosure 200 with the lid 950 fastened to the container 205.

Each slot of one face 207a, 207b of the container 205 is adapted to receive a tray 910 with a corresponding slot 210 of the opposing face 207a, 207b. In this way, the enclosure 200 is configured to provide a rigid spacing between the plurality of cells 900.

The spacing of the plurality of slots 210 is configured so that an air space between a respective cell 900 of each tray 910 is created sufficient to allow a convection air current to flow therebetween.

The lid 950 is configured to couple with the container 205. Each of the plurality of tabs 960 of the lid 950 is adapted to mate with a corresponding slot 210 in each of the opposing faces 207a, 207b of the container 205 when the lid 950 is coupled to the container 205. Each of the plurality of tabs 960 is configured to inhibit movement of a respective tray 910 in a respective slot 210 when the lid 950 is coupled to the container 205. The flexible seal is adapted to create a waterproof seal with the lid 950 when the lid 950 is coupled to the container 205. The cavity in the lid 950 is adapted to receive the BMS 101.

The terminals 970a, 970b in the lid 950 are operable to electrically couple the battery 105 to a power source or drain. The optional coupling 106 is arranged so that the BMS 101 can control the current to and/or from an individual cell 900, for example to balance the cells 900.

To assemble the enclosure 200, the cells 900 are first thermally bonded to the trays 910 and arranged in a stacked pattern. The cells 900 are then electrically coupled via their tabs 901a, 901b and the conductor 153. The terminals 151a, 151b are coupled to the first and last of the series of cells 900. The stack of cells 900 is inserted into the container 205 and each tray 910 is inserted into a corresponding pair of slots 210 in the container 205.

Once the trays 910 are inserted into the slots 210, a mylar film 175 is placed over the exposed end of the cells 900 to electrically insulate the BMS 101 from the cells 900. The BMS 101 is placed over the mylar film 175 and coupled to the terminals 151a, 151b of the battery 105. The BMS 101 is then fixed with respect to the cells 900 and trays 910. The BMS 101 is coupled to terminals 9701, 970b via a fuse 180.

The lid 950 is placed over the BMS 101 so that the BMS 101 fits in a cavity in the lid 950 and the tabs 960 are received by the slots 910 in the container 205 so as to hold the trays 910 in place and inhibit movement of the trays 910 in the slots 210. As the lid 950 is fastened to the container 205, as shown in FIG. 9, the terminals 970a, 970b coupled to the BMS 101 project through the lid 950. The flexible seal creates a waterproof seal between the container 205 and the lid 950. In the example shown, the waterproof seal complies with IP 65.

In some examples, the BMS 101 comprises a flexible coupling between the BMS 101 and the battery terminals 970a, 970b. The flexible coupling is configured to allow movement of the BMS 101 with respect to the enclosure 200 while maintaining an electrical connection between the terminal and the BMS 101.

Other embodiments of the disclosure relate to an enclosure for a rechargeable battery 105 comprising a plurality of cells 900. The enclosure comprises a container and a lid, for example similar to the enclosure 200, container 205 and lid 950 shown in FIGS. 8 and 9. The container is adapted to receive a plurality of cells 900 rigidly coupled together via a BMS 101, and comprises a flexible connection between the BMS 101 and battery terminals 970a, 970b on the lid.

Other embodiments of the disclosure relate to an enclosure for a rechargeable battery 105 comprising a plurality of cells 900. The enclosure comprises a rigid box providing a rigid spacing between battery terminals 970a, 970b, for example similar to the enclosure 200 shown in FIGS. 8 and 9. The enclosure provides a flexible coupling between the battery cells 900 and the battery terminals 970a, 970b. The flexible coupling carries a BMS 101.

In the examples described above, the connection between the cells 900 and the BMS 101 may have a greater rigidity than the connection between the BMS 101 and the terminals 970a, 970b.

Other embodiments of the disclosure relate to a battery assembly for housing a plurality of battery cells. The assembly comprises a plurality of trays, each tray configured to support a respective cell, a scaffold rigidly connecting each tray, wherein the scaffold carries a plurality of bus bars, each bus bar configured to electrically couple to a respective pair of cells, and a flexible connection between each cell and each bus bar. The cells and trays may be the cells 900 and trays 910 described above. The battery assembly may improve the strength of a battery pack comprising the battery assembly and help prevent the battery from being damaged. For example, the scaffold may prevent the cells from moving relative to each other in the event of a shear force being applied to the trays 910, or to a container, such as the container 205 shown in FIG. 9 or 14, carrying the battery assembly. The battery assembly may also more securely hold and support a BMS, such as the BMS described above, in an enclosure such as the enclosure described above.

An example battery assembly 400 is shown in FIGS. 10 to 14. The assembly 400 comprises a plurality of battery cells 900 each coupled to a respective tray 910. The trays 910 may be the trays described and used above in relation to FIGS. 5, 6 and 7. For example, the trays may be made from aluminium so as to be thermally conductive yet lightweight. Each cell 900 is bonded to a respective tray 910 via the application of a hydraulic press. Each cell 900 may be bonded to a respective tray 910 with a thermally conductive adhesive, for example.

Each tray 910 comprises a pair of flanges 415 at the same end of the tray 910 for connecting to a scaffold 410. The flanges 415 are rounded to project at an angle perpendicular to that of the tray 910. The trays 910 are rigidly connected together via the flanges 415 connected to the scaffold 410 in a stack. The scaffold 410 is in a plane perpendicular to that of the trays 910, such that the scaffold extends across the tops of each of the trays 910. The scaffold 410 holds the trays 910 in a stack such that the trays 910 are in a spaced configuration sufficient to allow a convention air current to flow therebetween.

The scaffold 410 in the example shown in FIGS. 10 to 14 is a generally rectangular flat plate. It is electrically insulating, for example it is made from laminated plastic such as Tufnol®. The scaffold 410 comprises apertures for receiving tabs 901a, 901b extending from the battery cells 900, as well as a fastener such as a screw and thread or a nut and bolt for fastening the scaffold 410 to each of the trays 910 and/or to a container such as the container 205 shown in FIG. 9. The fastener may be adapted to resist vibration. The scaffold 410 may also comprise holes for receiving a thermal harness coupled to each of the cells 900. The scaffold 410 has one face facing the plurality of cells 900, and another face facing away from the cells 900. The scaffold 410 carries a plurality of conductive bus bars 420 on the face facing away from the cells 900.

As with the cells 900 described above, each cell 900 has two spaced tabs 901a, 901b on the same end, for electrically coupling to the cell 900. Each cell 900 has a positive polarity tab 901a and a negative polarity tab 901b. The tab 901a, 901b of one cell 900 is coupled to a tab 901a, 901b of an opposite polarity of an adjacent cell 900 via the bus bar 420 carried by the scaffold 410, although other conductive materials may be suitable. Due to the stacked arrangement of the cells 900, the bus bar 420 coupling the tab 901a, 901b of one cell 900 to a tab 901a, 901b of another cell 900 is arranged in a concertina or dog-leg pattern.

The scaffold 410 further comprises a flexible connection for coupling each cell 900 to the bus bar 420. In the example shown in FIGS. 10 to 14, the scaffold 410 carries a plurality of clamps 430 for clamping the tabs 901 a, 901 b of the cells 900 to the bus bar 420. The clamps 430 clamp the tabs 901a, 901b in a plane transverse to that of each tray 910, for example in a plane perpendicular to each tray 910 and parallel to that of the scaffold 410, as shown in FIGS. 10 to 14. As shown in FIGS. 10 to 14, the clamps 430 are arranged so that a tab 901 a of one polarity of a first cell 900 is coupled to the tab 901 b of an opposite polarity of a second cell 900 via the bus bar 420. The clamp 430 may therefore comprise a portion of the bus bar 420.

Figure 14:
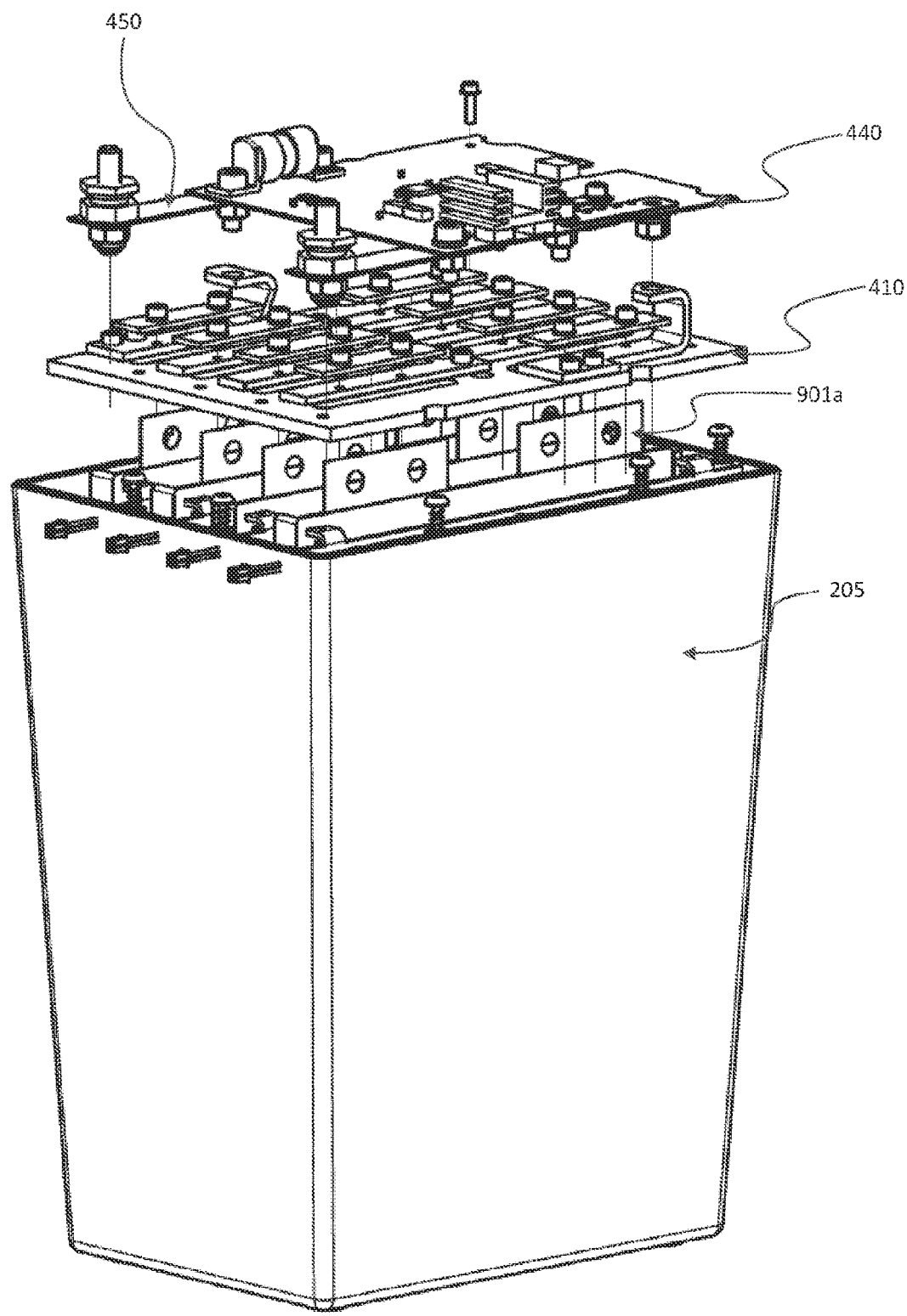
FIG. 14 shows a perspective view of a battery assembly such as the battery assembly of FIGS. 10 to 13 in a container, such as the container of FIG. 9.

As shown in FIG. 14, the scaffold 410 of the battery assembly 400 is configured to support a printed circuit board 440 spaced from the scaffold 410 and electrically coupled to the bus bars 420. The printed circuit board 440 shown in FIG. 14 is adapted to fit within a lid 950 of an enclosure such as the enclosure 200 shown in FIG. 9, and has a footprint equal to or less than that of the scaffold 410. The printed circuit board 440 comprises two arms 450 each electrically coupled to respective terminals 970a, 970b on the outside of the container for providing power from the cells 900. At least one fuse is coupled in series to an arm 450. The printed circuit board 440 comprises a BMS, such as the BMS 101 described above.

In the example shown in FIG. 14, a portion of a bus bar 420 is configured to support the printed circuit board 440 spaced from scaffold 410. A portion of a first bus bar 420 and a portion of a second bus bar 420 is rounded to provide a U-shape to support the printed circuit board 440 spaced from the scaffold 410. Rounding of the bus bar 420 may prevent fracture in the event of a large shear force being applied to the battery assembly 400. The scaffold 410 may further comprise additional fixing points to further support the printed circuit board 44 spaced from the scaffold 410.

Figure 15:
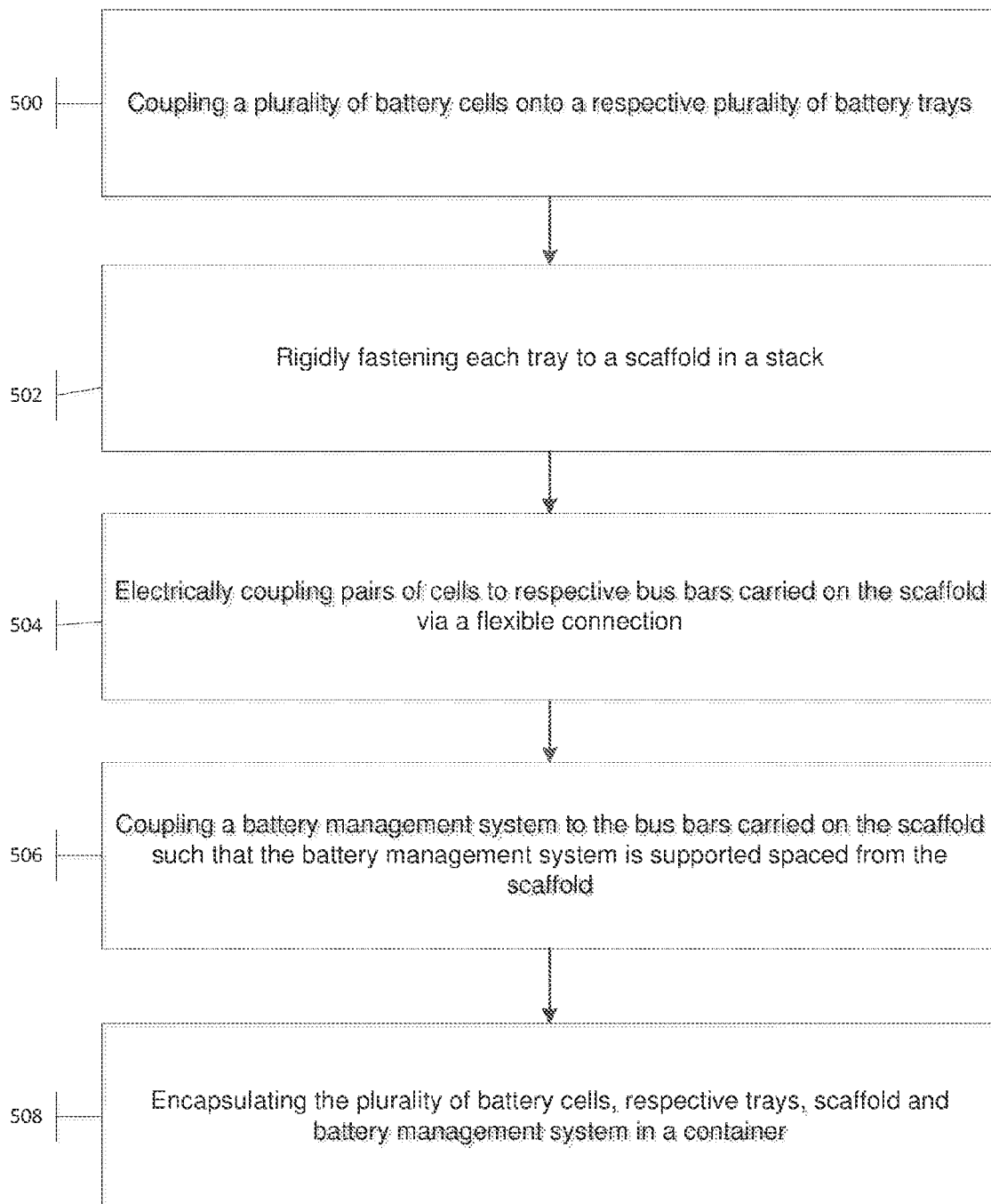
FIG. 15 shows a method for manufacturing a battery pack.

Other aspects of the disclosure relate to a method of manufacturing a battery pack, such as the battery pack 400 described above. As shown in FIG. 15, the method comprises coupling 500 a plurality of battery cells 900 onto a respective plurality of battery trays 910, rigidly fastening 502 each tray 910 to a scaffold 410 in a stack, electrically coupling 504 pairs of cells 900 to respective bus bars 420 carried on the scaffold 410 via a flexible connection, coupling 506 a BMS 101 to the bus bars 420 carried on the scaffold 410 such that the BMS 101 is supported spaced from the scaffold 410, and encapsulating 508 the plurality of battery cells 900, respective trays 910, scaffold 410 and BMS 101 in a container 205.

In some examples, coupling the plurality of battery cells 900 onto a respective plurality of battery trays 910 comprises bonding each cell onto each respective tray with a thermally conductive adhesive. In some examples, coupling the plurality of battery cells 900 onto a respective plurality of battery trays 910 comprises hydraulically pressing each cell 900 onto each respective tray 910.

Encapsulating the plurality of battery cells 900, respective trays 910, scaffold 410 and BMS 101 in a container 205 may comprise inserting each tray 910 into a respective pair of slots 210 in a container 205 and coupling the BMS 101 to a pair of terminals 970a, 970b on the outside of the container 205. The trays 910 may be fixed in the slots 210 via an adhesive such as silicone.

Electrically coupling each cell 900 to bus bars 420 on the scaffold 410 may comprise clamping a tab 901a, 901b extending from each cell 900 to the bus bar 420 in a direction transverse to that of each tray 910, for example in a direction perpendicular to each tray 910. Clamping the tabs 901a, 901b in this way may provide further strength in the event of a shear force being applied to the battery assembly 400.

It will be understood in the context of the present disclosure that the BMS 101 or battery pack 100 described above in relation to a particular Figure may comprise features that may be used in the context of another example. The BMS 101 may comprise the features of the BMS 101 described above in relation to FIG. 1, 2, 3 or 4. For example, the BMS 101 may comprise a controller 103, a sensor 109 and/or a data store 107. The controller 103 may be configured to communicate over the CAN. For example, the controller 103 may be configured to write data relating to the at least one parameter to a data store 107 via the CAN.

For example, the BMS 101 described above in relation to FIGS. 2 to 9 may comprise a wireless interface 113, a data reader 111, a data store 107, a sensor 109 and a controller, and may record data to the data store 107 using a primary power supply, such as the battery 105, and read data from the data store 107 using an auxiliary power supply provided via the wireless interface 113.

In other examples, the BMS 101 described above in relation to FIGS. 1 and 3 to 9 may record data to a data store based on a threshold condition, as described above in relation to FIG. 2.

In other examples, the BMS 101 described above in relation to FIGS. 1 to 2 and 4 to 9 may power down different sets of components depending on whether different sets of conditions are met, as described above in relation to FIG. 3. The BMS 101 may comprise a network interface 113 and a power controller 115. For example, in response to the sensor signal meeting a first condition, the controller 103 is configured to power down a first set of components of the BMS 101 (such as the network interface 113), and in response to the sensor signal meeting a second condition, the controller 103 is configured to power down a second set of components of the BMS 101 (such as the power controller 115).

In other examples, the BMS 101 described above in relation to FIGS. 1 to 3 and 5 to 9 may operate in a low power mode if the battery 105 has not been used for a while, as described above in relation to FIG. 4. For example, the controller 103 is configured to operate the BMS 101 in a low power mode in the event that the current and/or voltage is less than a selected threshold level, for example less than a selected threshold level for more than a selected time interval. The BMS 101 may comprise a wireless interface 113 and/or a power controller 115, and the low power mode may comprise reducing the power supplied to the wireless interface 113 and/or the power controller 115.

The BMS 101 may comprise a wireless interface 113 for communicating over a network. The BMS 101 may also comprise a physical interface, such as a CAN or RS485 port, for communication over a CAN bus or an RS485 bus. The controller 103 may be configured to communicate information regarding the battery 105 via the wireless interface 113 or the physical interface. For example, the controller 103 may be configured to communicate information regarding charging and discharging of the battery 105 to a charging station 300 over a CAN. The controller 103 may be configured to communicate at least one of: temperature of battery, indication of level of charge of battery, charging current to battery and voltage of battery.

Although LiFePO$_4$ (lithium iron phosphate) cells have been described above, any lithium cell chemistry may be used, such as LiCoO$_2$ or LiMn$_2$O$_4$, lithium titanate, lithium sulphur, lithium polymer or lithium-ion polymer. Other cell chemistries may also be used.

All the embodiments described above, and each and every claimed feature may be used in on-highway and/or off-highway applications. For example, the embodiments described above, and each and every claimed feature may be used solely in on-highway or off-highway applications. The embodiments described above and each and every claimed feature may be used in an on-highway or an off-highway electric machine, or an on-highway or an off-highway electric apparatus. For example the embodiments described above and each and every claimed feature may be used in electric or hybrid vehicles for use on-highway and/or off-highway. For example, the rechargeable battery packs 100 described herein may be used, for example in electric or hybrid vehicles for use on-highway and/or off-highway. For example, embodiments described above and each and every claimed feature may be used in automotive applications (both on highway and off highway), offshore applications (off highway), in a warehouse environment (for example for use with mechanical handling equipment such as fork-lift trucks and autonomous guided vehicles, for example as described in WO 98/49075—off highway) as well as in energy storage applications (both commercial and domestic—also off highway).

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The methods and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Embodiments of the disclosure provide computer program products, and computer readable media, such as tangible non-transitory media, storing instructions to program a processor to perform any one or more of the methods described herein. Other variations and modifications of the apparatus will be apparent to persons of skill in the art in the context of the present disclosure.

Where configuration of a processor, or other programmable component, is described this may be achieved by procedural or object oriented programming, or by the use of scripting which incorporates a mixture of both procedural and object oriented approaches. In some cases FGPAs or ASICs may be used to provide these configurations.

The data stores described herein may be provided by volatile or involatile memory storage such as RAM, EEPROM, FLASH memory, or any other form of computer readable media.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

It is suggested that any feature of any one of the examples disclosed herein may be combined with any selected features of any of the other examples described herein. For example, features of methods may be implemented in suitably configured hardware, and the configuration of the specific hardware described herein may be employed in methods implemented using other hardware.

The invention claimed is:

1. A battery management system for a rechargeable battery, comprising:
   a controller;
   at least one sensor for providing a sensor signal relating to at least one parameter of the rechargeable battery to the controller; and
   a data store;
   wherein the controller is configured to:
      compare the sensor signal to a threshold condition; and
      determine whether to write data to the data store based on the comparison with the threshold condition;
      wherein the threshold condition comprises at least one of: a cell voltage greater than 3.6 V, a cell voltage less than 3.0 V, a battery voltage greater than 14.6 V, a battery voltage less than 12.0 V, a charge temperature greater than 45° C., a charge temperature less than 0° C., a discharge temperature greater than 45° C., a discharge temperature less than −15° C., a storage temperature greater than 45° C., a storage temperature less than −30° C., a charge current greater than 100 A, and a discharge current greater than 100 A.

2. A battery management system for a rechargeable battery, comprising:
  a controller;
  at least one sensor for providing a sensor signal relating to at least one parameter of the rechargeable battery to the controller; and
  a data store;
  wherein the controller is configured to:
    compare the sensor signal to a threshold condition; and
    determine whether to write data to the data store based on the comparison with the threshold condition;
    wherein, in response to the at least one sensor signal reaching and/or exceeding a first threshold condition, the controller is configured to power down a first set of components of the battery management system, and in response to the signals indicative of at least one of the at least one parameters reaching and/or exceeding a second threshold condition, the controller is configured to power down a second set of components of the battery management system; and
  wherein the threshold condition is a charge current greater than 100 A.

* * * * *